United States Patent [19]
Rall

[11] Patent Number: 5,294,200
[45] Date of Patent: Mar. 15, 1994

[54] AUTOCALIBRATING DUAL SENSOR NON-CONTACT TEMPERATURE MEASURING DEVICE

[75] Inventor: Dieter L. Rall, Los Gatos, Calif.

[73] Assignee: Luxtron Corporation, Mountain View, Calif.

[21] Appl. No.: 859,819

[22] Filed: Mar. 30, 1992

Related U.S. Application Data

[63] Continuation-in-part of Ser. No. 429,983, Nov. 1, 1989, Pat. No. 5,216,625.

[51] Int. Cl.$^5$ .................. G01K 13/06; G01K 7/02; G01L 5/04
[52] U.S. Cl. .................. 374/120; 374/121; 374/141; 374/134; 73/160; 364/557
[58] Field of Search .............. 374/120, 121, 134, 141, 374/29, 30; 73/160; 364/557

[56] References Cited

U.S. PATENT DOCUMENTS

| | | | |
|---|---|---|---|
| 2,618,672 | 11/1952 | Cizmadia et al. | 374/153 |
| 2,991,654 | 7/1961 | Engelhard | 374/135 |
| 3,099,160 | 7/1963 | Werner et al. | 374/134 |
| 3,111,844 | 11/1963 | Van Luik, Jr. | 374/29 |
| 3,191,437 | 6/1965 | Heard, Jr. | 374/153 |
| 3,246,519 | 4/1966 | Dornberger | 374/153 |
| 3,427,882 | 2/1969 | Wagner | 374/120 |
| 3,430,492 | 3/1969 | Matsumoto et al. | 374/153 |
| 3,475,962 | 11/1969 | Mazur | 374/121 |
| 3,525,260 | 8/1970 | Kung | 136/214 |
| 3,534,610 | 10/1970 | Pruden | 374/153 |
| 3,542,123 | 11/1970 | Hornbaker | 165/39 |
| 3,605,490 | 9/1971 | Progelhof et al. | 374/29 |
| 3,715,923 | 2/1973 | Hornbaker et al. | 374/134 |
| 3,720,103 | 3/1973 | Adams et al. | 372/29 |
| 3,926,053 | 12/1975 | Schurrer et al. | 374/101 |
| 4,408,903 | 10/1983 | Baldasarri | 374/121 |
| 4,479,979 | 10/1984 | Prober | 73/160 |
| 4,621,615 | 11/1986 | McGee | 374/29 |
| 4,906,105 | 3/1990 | Geake | 374/121 |
| 5,001,925 | 3/1991 | Turek | 73/160 |
| 5,081,359 | 1/1992 | Pompei | 374/121 |

FOREIGN PATENT DOCUMENTS 1573346 6/1979 Fed. Rep. of Germany.

Primary Examiner—Diego F. F. Gutierrez
Attorney, Agent, or Firm—Majestic, Parsons, Siebert & Hsue

[57] ABSTRACT

A device for measuring the temperature of an external moving filament is disclosed. The device includes dual thermal sinks or reference bodies; each reference body has two heat flow sensors that are matched in sensitivity and are connected in series. By utilizing dual thermal reference bodies, which are maintained at different temperatures, the device yields the absolute temperature of the filament by measuring the temperatures of the referenced bodies and the heat flow rates between each of the reference bodies and the filament. The device automatically calculates the proportionality constant between the heat flow rates and the temperature differences between the filament and the reference bodies and thus calculates the filament temperature. Each heat flow sensor has a row of sensitive elements or active junction lines that is not parallel to the path of the filament. This orientation of the sensitive elements provides more accurate temperature measurements even when the path of the filament should constantly change.

8 Claims, 5 Drawing Sheets

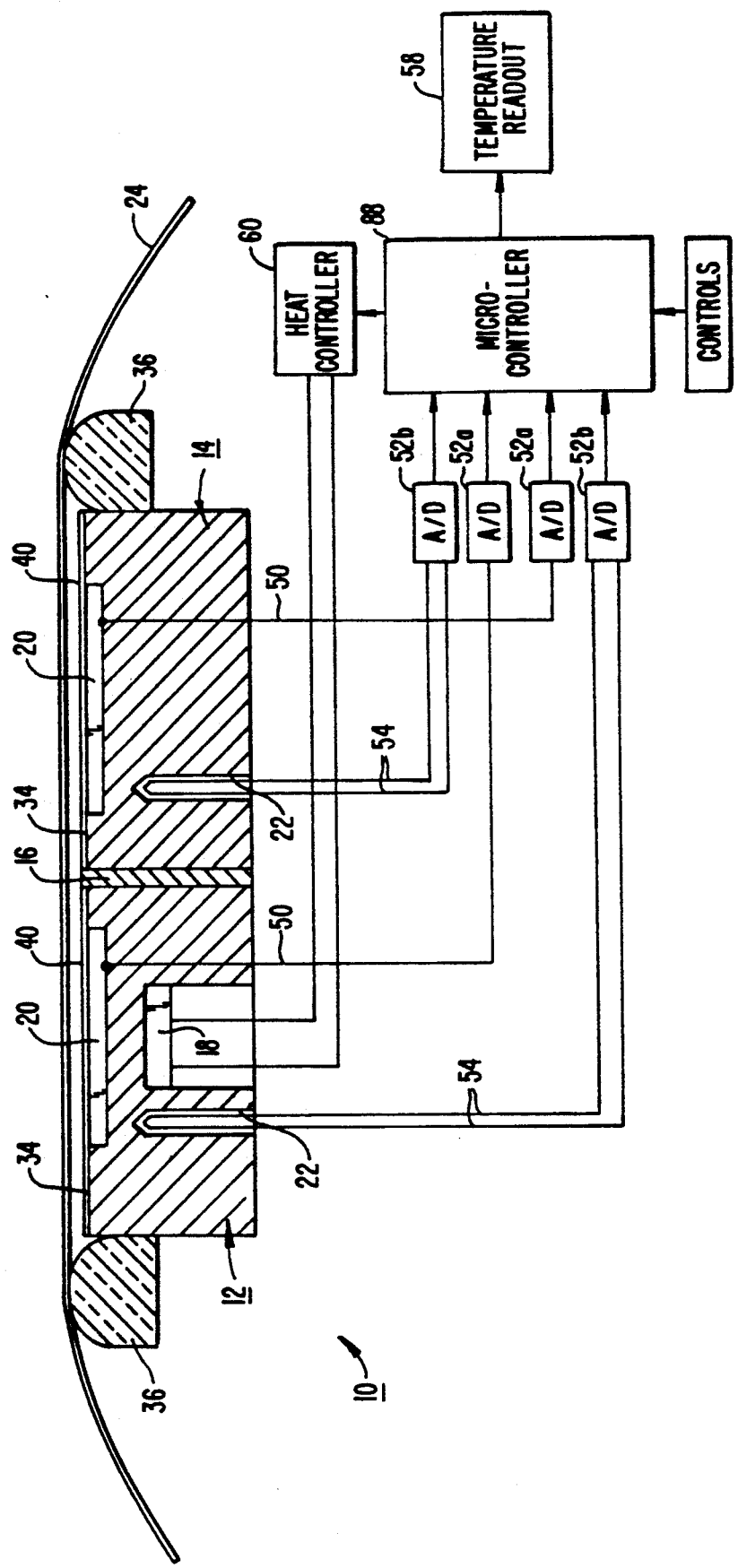
FIG._1.

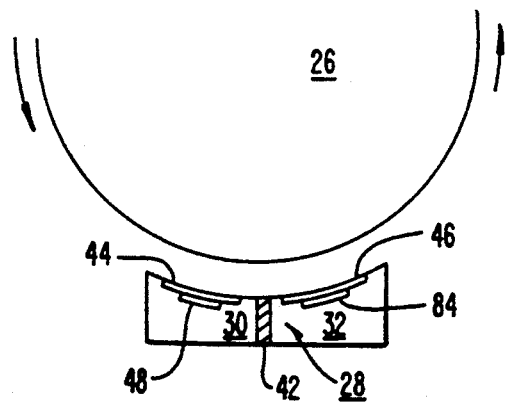
FIG._2.
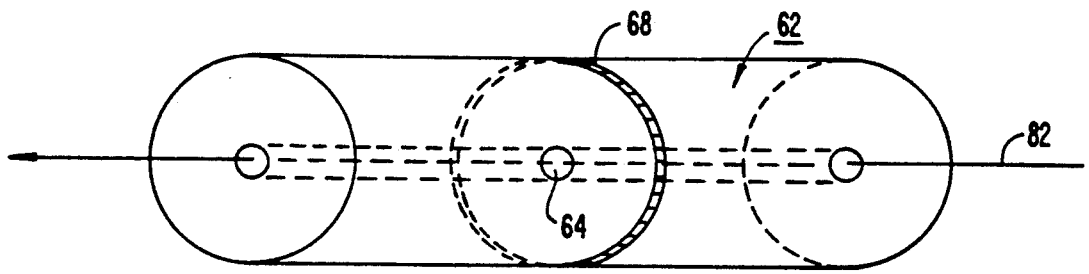
FIG._3.
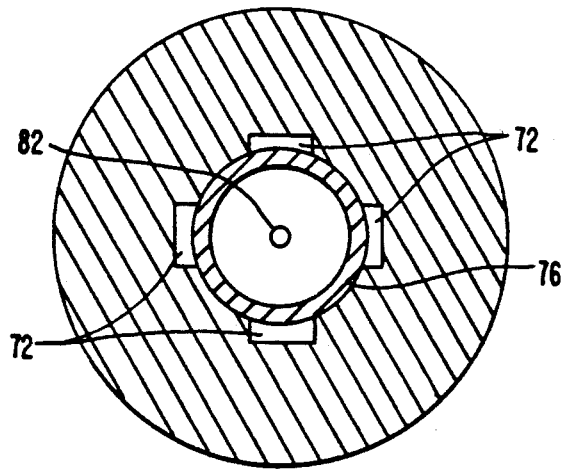
FIG._5.

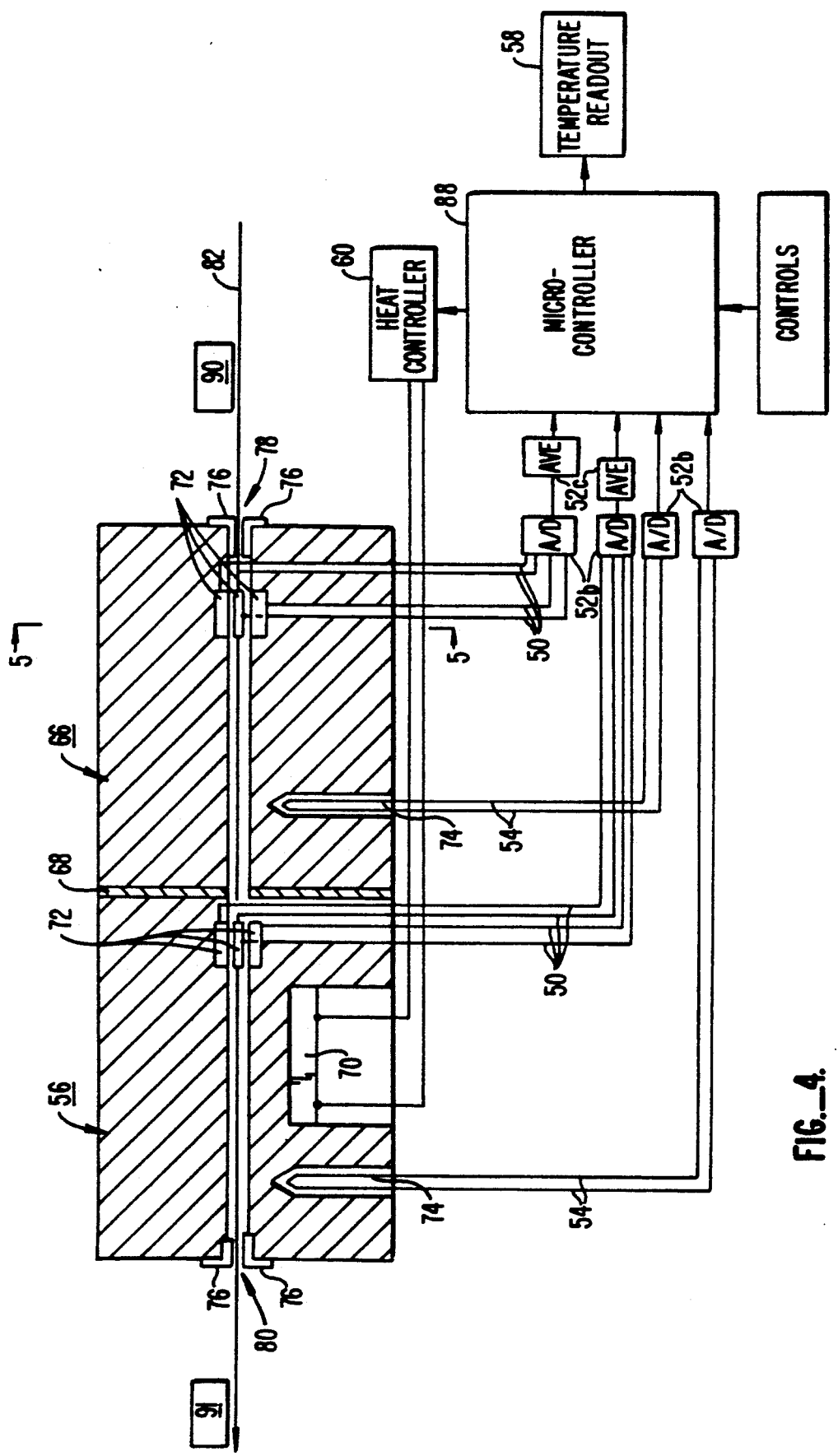
FIG._4.

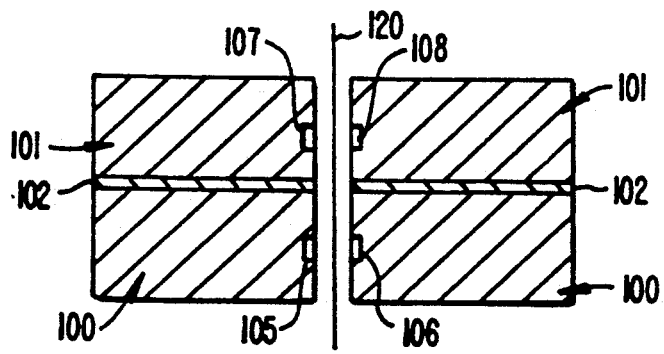
FIG._6.
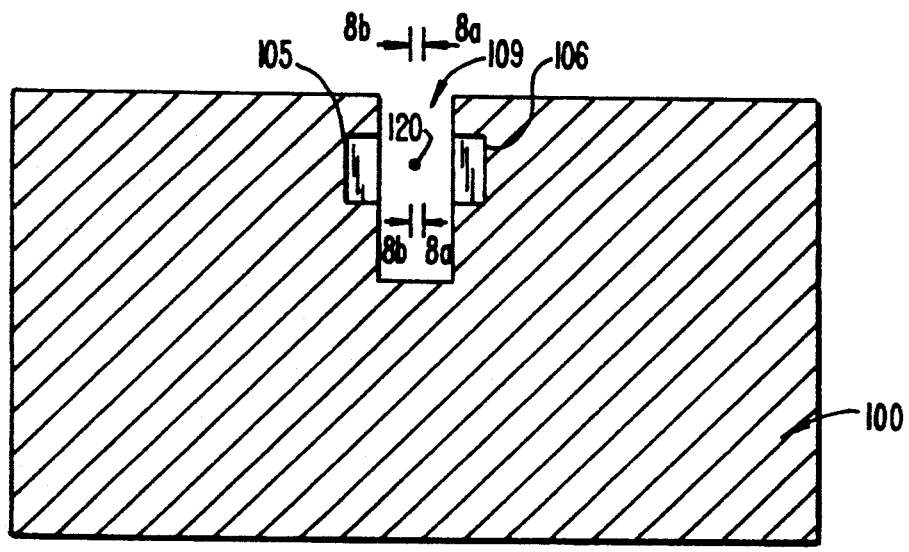
FIG._7.
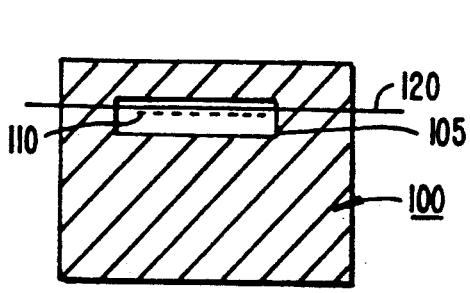
FIG._8a.
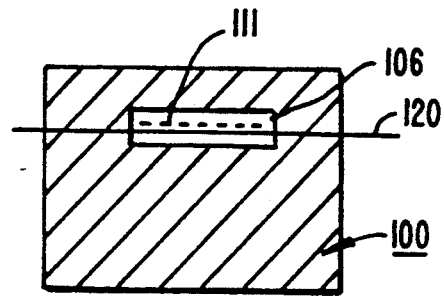
FIG._8b.

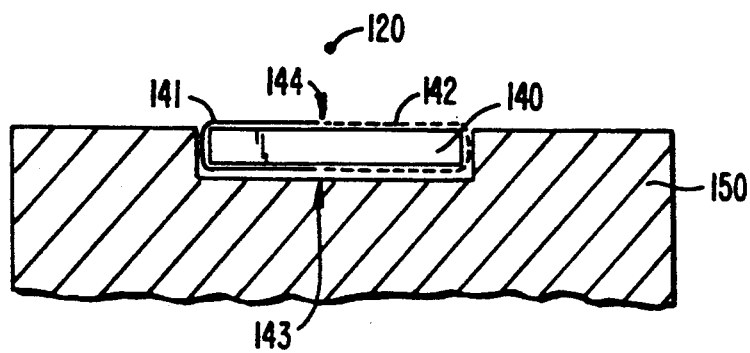
FIG._9.
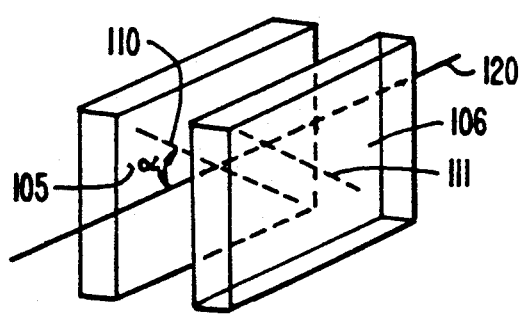
FIG._10.
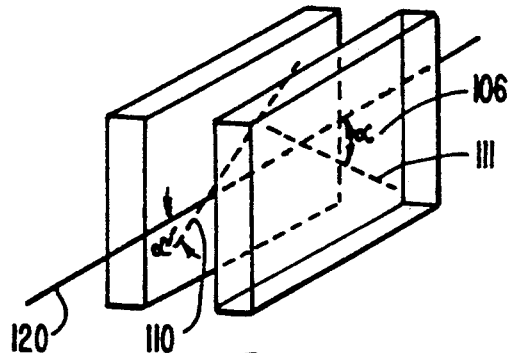
FIG._11.

AUTOCALIBRATING DUAL SENSOR NON-CONTACT TEMPERATURE MEASURING DEVICE

This application is a continuation-in-part application of Ser. No. 07/429,983, filed Nov. 1, 1989, which issued as U.S. Pat. 5,216,625, on Jun. 1, 1993, and has a common assignee.

BACKGROUND OF THE INVENTION

This invention relates generally to a method and apparatus for measuring the temperature of an external medium or approximate body, and particularly a moving external body.

The temperature of moving and non-moving objects is generally now measured by a variety of methods and apparatuses including non-contact temperature detection devices which rely on the principle that net heat exchange between a reference body and an external body is zero when the bodies are at the same temperature. Reference is made to U.S. Pat. Nos. 3,542,123 and 3,715,923 for details regarding an apparatus employing this principle. Such non-contact devices contain a high thermal conductivity reference body mounting a heat flow sensor to determine the heat flow between the reference body and an external body located adjacent to the reference body. A temperature sensor provides a signal proportional to the temperature of the referenced body. In addition, the apparatus includes means for establishing the spacing between the reference and external bodies so that the heat flow sensor output signal can be calibrated to yield the absolute temperature of the external body.

As the external body moves past the heat flow sensitive surface of the reference body, heat will be exchanged by convection between the external and reference bodies whenever they are not at the same temperature. This will cause heat to flow into or out of the sensing head surface of the reference body. The magnitude of heat flow will be proportional to the temperature difference between the bodies, the distance between the bodies, and the thermal conductance of the heat flow path across the spacing between them. By keeping the spacing constant, it is possible to calibrate the heat flow rate, measured by the heat flow sensor in the reference body, as a function of the temperature difference between the reference and external bodies for a given reference body temperature. By adding this measured, calibrated temperature difference between the bodies to the reference body temperature measured by the temperature sensor in the reference body, the temperature of the external moving body is obtained. While the devices are primarily used to measure the temperature of moving objects, they are suitable for many applications involving stationary objects as well.

However, one major drawback of these non-contact devices is that they must be manually recalibrated whenever the spacing or heat transfer conditions between the reference and external bodies changes, thereby resulting in unnecessary delays.

Therefore, it is a primary object of the present invention to provide an improved, convenient method and apparatus for measuring the temperature of an external body that continues to function even as conditions between the apparatus and external body change.

It is another object of the present invention to provide an improved method and apparatus for measuring the temperature of an external body that automatically calculates the proportionality constant between the heat flow rate and the temperature gradient between the external body and the reference body.

It is a further object of the present invention to provide an improved method and apparatus for measuring the temperature of fast-moving continuous elements such as wires, filaments, webs and rolls.

SUMMARY OF THE INVENTION

These and additional objects are accomplished by the various aspects of the present invention wherein a temperature measuring apparatus is provided which includes two heat flow sensors of the same sensitivity designated as heat flow sensor A and heat flow sensor B with each sensor being mounted in a high thermal conductivity reference body, designated reference body A and reference body B, respectively. The two reference bodies operate at different temperatures as one of the bodies is either heated or cooled; moreover, a thermal barrier between them maintains the temperature differential. The temperatures of the referenced bodies, denoted $T_A$ and $T_B$, respectively, are measured by temperature sensors located in the bodies.

Each heat flow sensor measures the heat flow between its reference body and an external body, whose temperature is being measured. When the reference bodies are exposed to the external body, the heat transfer rates between the two heat flow sensors and the external body are proportional to the respective temperature differences between the two heat flow sensors and the external body. The heat flow sensors also generate signals such as voltage output signals, denoted as $E_A$ and $E_B$, that are proportional to said temperature differentials. Based on the measured values of $T_A$, $T_B$, $E_A$ and $E_B$, the invention further enables the determination of the external body temperature.

The invention obviates the need for calibrating the heat flow sensor output signals to the spacing between the reference and external bodies. Thus, even if the distance or configuration of the spacing between the external body and the reference bodies changes, the invention continues to monitor the temperature of the external body. This is particularly advantageous for measuring the temperature of moving objects or in other applications where this distance or configuration is subject to change. The only criterion is that fluctuations in this distance caused by changes in the external body be equal relative to both reference bodies. In other words, while the distance between reference body A and the external body, denoted $X_A$, and the distance between reference body B and the external body, denoted $X_B$, are variables that may change with time, the inventive concept remains applicable so long as $X_A$ equals $X_B$.

For instance, in the production of photographic film, wires or plastic filaments, it is desirable to monitor the temperature of these products and to do so without contact. The inventive apparatus is ideally suited for this purpose since the device does not disturb the product by physical engagement; moreover, even when process conditions change, as when wires of different thicknesses are manufactured, the apparatus continues to operate without the need to shut down the process for recalibration.

In another aspect of the invention, each of the two referenced bodies has two heat flow sensors comprised of thermopile sensors that face each other. The two thermopiles are matched in sensitivity and are connected in series. A filament to be measured, such as an optical fiber, is positioned between the two thermopiles. It has been found that more accurate measurements are obtained when the two thermopile sensors of each reference body are oriented so that the active junction line of each sensor is not parallel to the axis of the filament. By positioning the two sensors in this fashion, temperature measurements are more accurate and less sensitive to movement of the filament.

However, like any other temperature measuring device, the apparatus has certain practical limitations. For example, since the reference bodies are maintained at different temperatures, there will always be a temperature differential between the external object and at least one of the reference bodies. Therefore, the temperature of an object will be influenced by the apparatus itself, although the amount of influence is negligible when the object is moving and not in contact with reference bodies.

Notwithstanding the above limitations, the inventive method and apparatus can be utilized in an array of applications including those described above. Moreover, these limitations, which are inherent to temperature measuring devices in general, are recognized and readily dealt with by persons skilled in the art when using the invention.

BRIEF DESCRIPTION OF THE DRAWINGS

FIG. 1 is a partially diagrammatic view of an embodiment of the present temperature measuring apparatus, including an enlarged transverse cross-sectional view of the reference bodies, which is adapted for detecting the temperature of a moving web;

FIG. 2 is a diagrammatic view of the reference bodies of an embodiment of the invention whose surfaces are contoured to match the curvature of a moving roll;

FIG. 3 is a perspective view of an embodiment of the temperature detection apparatus which is particularly adopted for detecting the temperature of fast moving elongated objects;

FIG. 4 is a partially diagrammatic view of the apparatus in FIG. 3, including an enlarged transverse cross-sectional view of the reference bodies; and FIG. 5 is a view taken along the line 5—5 of FIG. 4.

FIG. 6 is a top view of a device of an embodiment of the invention which is particularly well suited for measuring the temperature of delicate filaments.

FIG. 7 is a front view of the device shown in FIG. 6.

FIGS. 8a and 8b illustrate thermopiles embedded in one of the two reference bodies taken partially along the lines 8a—8a and 8b—8b, respectively, from FIG. 7.

FIG. 9 shows a schematic side view of a thermopile as embedded in a reference body.

FIGS. 10 and 11 illustrate thermopiles embedded into the reference bodies and oriented so that the active junction lines are not parallel to the filament.

DESCRIPTION OF THE PREFERRED EMBODIMENTS

One feature of the present invention is the ability of the apparatus to measure the temperature of an object without physical contact. This feature arises from the recognition that the heat flow rate between a reference body and an external body is proportional to the temperature of the latter. By employing dual heat flow sensors of the same sensitivity, the present invention also achieves autocalibration. It should be noted that while heat flow sensors manufactured from the same design and materials exhibit the same sensitivities, to practice the prevent invention it is not necessary to employ identical sensors but only heat flow sensors of the same sensitivity. The autocalibration aspect of the invention is based on the correlation between the external body temperature, the reference body temperatures, and the voltage generated by the heat flow sensors.

It is generally known that the heat flow rates between two heat flow sensors of the same sensitivity (designated as sensor A and sensor B) and the external body or product can be expressed as:

$$Q_A = CE_A = \frac{K}{\Delta X}(T_P - T_A)$$

$$Q_B = CE_B = \frac{K}{\Delta X}(T_P - T_B)$$

where:
$Q_A$ = heat flow rate between product and sensor A
$Q_B$ = heat flow rate between product and sensor B
$K$ = conductance of thermal path between product and sensor (identical for both sensors)
$\Delta X$ = distance of thermal path between product and sensor (identical for both sensors)
$C$ = constant of proportionality between $Q_A$ and $E_A$, and $Q_B$ and $E_B$. (Identical as both heat flow sensors are made with the same sensitivity.)
$E_A$ = voltage generated by heat flow sensor A and is proportional to $Q_A$
$E_B$ = voltage generated by heat flow sensor B and is proportional to $Q_B$
$T_P$ = temperature of external body or product
$T_A$ = temperature of reference body containing sensor A
$T_B$ = temperature of reference body containing sensor B From these two equations, the temperature of the external body or product can, according to the present invention, be expressed as:

$$T_P = T_A + E_A\left(\frac{T_A - T_B}{E_B - E_A}\right)$$

wherein the temperature of the external body or product $T_P$ is expressed as a function of $T_A$, $T_B$, $E_A$ and $E_B$ only. As described herein, the invention provides accurate measurements of these variables from which the temperature $T_P$ of the external body is calculated by the equation set forth above. The present invention is thus self-calibrating and insensitive to variations in the distance or conductivity of the spacing between an external body and the heat flow sensors. As will be described in greater detail, a micro-controller programmed to receive input signals corresponding to parameters $T_A$, $T_B$, $E_A$ and $E_B$ can be employed to calculate $T_P$ based on the above equation.

Referring now to FIG. 1, a temperature detection apparatus 10 is illustrated which comprises, generally, two thermally conductive reference bodies 12 and 14 separated by a thermal barrier 16; temperature change means for altering the temperature of reference body 12, including an electrical resistance heating element or cartridge 18; heat flow sensors 20 with the same sensitivity; and temperature sensors 22.

The apparatus 10 is adapted to detect the temperature of any fixed surface external body including films, webs, and elongated elements. The temperature of web 24 is measured by placement of the reference bodies 12 and 14 in proximity to the web 24 without physically contacting the web. A web encompasses any continuous material including thin metal sheets, fabrics, strips, paper, or the like. The reference bodies 12 and 14 are thermally conductive reference bodies made of material such as anodized aluminum, nickel plated copper or the like, and each constitutes a thermal sink into and out of which heat flow can occur.

In the first reference body 12, the operative face 34 is located a distance from the web 24 whose temperature is to be measured. The web 24 moves along a path in close proximity to the heat flow sensor 20 and the operative face 34 of reference body 12. The first reference body 12 and the second reference body 14 are separated by a thermal barrier 16 that can consist of an air gap or any suitable non-heat-conductive material such as aramid paper. For the second reference body 14, heat flow sensor 20 is the same distance from the web 24 as the heat flow sensor in the first reference body 12 is from the web. The distance between the web 24 and the heat flow sensors 20 afforded by this arrangement is approximately 0.030 to 0.125 inch, although of course, this will vary with product velocity and the attendant boundary layer thickness which will result from the particular application at hand.

Although not necessary to practice the invention, guides 36 can be employed to facilitate passage of the web across the heat flow sensors 20.

The cartridge heater 18 may be any suitable heater for rasing the temperature of the mass of reference body 12. Various other means could also be used for raising the temperature of the reference body 12, such as fluid heating passages provided therein. It should be noted that since the present invention requires only that the temperatures of the reference bodies 12 and 14 be different, cooling rather than heating one of the heads can be employed.

the particular form of heat flow sensor utilized is not critical to the present invention, so long as it is capable of sensing the convective heat flow resulting from a temperature differential between the web 24 and the mass of the reference bodies 12 and 14. The heat flow sensors 20 illustrated are thermoelectric devices or differential thermopiles adapted to generate voltages proportional to the rates of heat flow into or out of the surfaces on which they are mounted.

Each operative face 34 may be provided with a thin thermally reflective coating 40, such as gold or aluminum, which is operative to reflect any extraneous radiant heat flow component through the web 24 or elsewhere, without affecting the larger and more significant convective-conductive heat flow components. Although not part of the inventive method, reflective coating is useful when the product to be measured is made of material that is transparent to radiation.

The temperature sensor 22 is disposed within and in thermal exchange relation with the walls of a bore provided in reference body 12. A temperature sensor 22 is similarly situated in reference body 14. Each of the temperature sensors 22 is preferably a platinum RTD located relatively close to the operative faces 34. The temperature sensors 22 generate voltages proportional to their temperatures and could, if desired, also take the form of thermocouples or other means suitable for the purpose described.

The output signals from the heat flow sensors 20 are applied through lead 50 to an analog to digital converter 52a. The converter 52a, as will be apparent to those skilled in the art, is selected and operated such as to adjust the magnitude of the output signals from the heat flow sensors 20 to a convenient sensitivity in terms of the volts per heat flow rate per unit area. The voltage output signal form heat flow sensor 20 in reference body 12 is designated $E_A$. Similarly, $E_B$ denotes the voltage output signal from heat flow sensor 20 in reference body 14. Output signals from the temperature sensors 22 in reference bodies 12 and 14 are applied through leads 54 to the analog to digital converter 52b. The signals from the temperature sensors 22 are converted to the temperatures of the reference bodies 12 and 14, denoted here as $T_A$ and $T_B$, respectively. Finally, the signals from the converters 52a and 52b are applied to a micro-controller 88 where the temperature of the external body or product $T_P$ is calculated via the equation for $T_P$ described above; $T_P$ is displayed on temperature read-out 58. The micro-controller 88 can also be used to regulate the temperature $T_A$ of head 12 by controlling the amount of heating (or cooling) of that reference body 12 via a heat controller 60. The present invention is applicable regardless of the temperature scale used.

FIG. 2 illustrates an embodiment of the present invention particularly suited for measuring the temperature of objects that have curved surfaces such as rolls used in rolling metal, calendering and laminating of sheet material and heating of textiles and drying in paper mills. As shown in FIG. 2, the temperature of a continuous roll 26 is being measured by apparatus 28 which consists, in part, of reference bodies 30 and 32 separated by barrier 42. The contour shape of the operative faces 44 and 46 is designed to coincide with the curvature of the roll in order that the distance between the roll 26 and heat flow sensor 48 be the same as the distance between the roll 26 and heat flow sensor 84. The description of the rest of the apparatus, not shown, including means for regulating the temperature of one reference body, temperature sensors and micro-controller, is the same as set forth previously.

FIGS. 3, 4 and 5 show an embodiment of the present invention that is particularly suited for measuring the temperatures of wires, filaments or other elongated elements moving along their longitudinal axes. This preferred embodiment comprises generally an apparatus 62 with an aperture 64 of approximately ⅛ inch in diameter that runs through the length of the apparatus' 62 center. Apparatus 62 is shown as a cylindrical device but, as is apparent from the description hereinbelow, its outer configuration is unimportant. However, for ease of description, the cylindrical form will be used.

The apparatus 62 comprises, generally, two thermally conductive reference bodies 56 and 66 that are separated by a thermal barrier 68; temperature change means for altering the temperature of the head; including an electrical resistance heating element 70; heat flow sensors 72; and temperature sensors 74. Except as further described, the hereinabove described components of the reference bodies 56 and 66 in this preferred embodiment are substantially the same as those found in the first-described apparatus 10 in FIG. 1 and their descriptions shall not be repeated.

Guides 76 are annularly situated at the entrance 78 and exit 80 of the apparatus 62. The guides 76, which can be made of ceramic, form the only potential points of contact with the filament 82 and generate negligible frictional heat. It should be noted that the purpose of the guides 76 is to prevent filament 82 from touching the surface of the aperture 64 or any other part of the apparatus. The function of guides 76 is not to maintain the filament 82 at any particular location in the aperture 64. As will be apparent, apparatus 62 yields accurate temperature measurements regardless of the filament's position inside the aperture 64.

Referring to FIG. 4, each reference body 56 and 66 comprises a plurality of heat flow sensors 72 situated around the moving filament 82. In this embodiment, in each reference body 56 and 66 are four heat flow sensors 72, spaced approximately 90 degrees apart around the filament 82. The output signals from the four heat flow sensors 72 in each reference body 56 and 66 are applied through leads 50 to an analog to digital converter 52a. Similarly, output signals from the temperature sensors 74 from both reference bodies 56 and 66 are applied through leads 54 to the converter 52b. The averager 52c averages the four output signals from the heat flow sensors 72 in each reference body 56 and 66 to yield one output signal for each reference body. The averagers also adjust the averaged signals to a convenient sensitivity in terms of the volts per heat flow rate per unit area. For convenience, the average voltage output signals from the heat flow sensors 72 of reference bodies 56 and 66 are designed as $E_A$ and $E_B$, respectively. The signals from the temperature sensors 74 are converted to the temperatures of the reference bodies, i.e., $T_A$ and $T_B$. Finally, the signals are applied to a micro-controller 54 where the temperature of the filament $T_P$ is calculated via the equation for $T_P$ described above; $T_P$ is displayed on temperature read-out 58. The micro-controller 88 can be used to regulate the temperature $T_A$ by controlling the amount of heating (or cooling) of that reference body 56 via a heat controller 60. In addition, the microcontroller can be employed to regulate pre-measurement heating and/or cooling device 90 and post-measurement heating and/or cooling device 91.

In the embodiment as shown in FIG. 1, it is of course not necessary to average the output signals from each flow sensor since there is only one heat flow sensor in each reference body. Moreover, technically there is no requirement that the four output signals from the four heat flow sensors in each of the reference bodies in the embodiment shown in FIGS. 3, 4, and 5 be averaged either since the number of heat flow sensor in each reference body is the same. However, the invention also encompasses embodiments in which the number of heat flow sensors in each reference body is not the same. For instance, in another embodiment, 10 heat flow sensors may be employed in reference body A whereas there are only two heat flow sensors in reference body B. In this embodiment, given that there are five times the number of heat flow sensors in reference body A, the heat flow sensors (collectively) are five times more sensitive than those in body B. In this latter embodiment, it would be necessary to use an average of the output signals from the heat flow sensors of each respective reference body rather than a sum of the signals.

Although averaging is theoretically not necessary for the specific embodiment as shown in FIGS. 3, 4, and 5, it is also apparent that averaging does not change the precision and accuracy of the inventive device either. In this embodiment, the sum of the generated voltages from the four heat flow sensors in each reference body would be proportional to the rates of heat flow caused by the filament.

FIGS. 6 and 7 show an embodiment of the invention which is particularly well suited for measuring the temperature of delicate filaments such as optical fibers that can be damaged by ceramic guides and that are difficult to string through the aperture of the device as shown in FIGS. 3, 4, and 5. FIG. 6 is a top view of a device which comprises dual reference bodies 100 and 101 that are separated by thermal barrier 102. Reference body 100 has dual heat flow sensors 105 and 106 whereas reference body 101 has dual heat flow sensors 107 and 108. Filament 120 is positioned in, and travels through, the channel or slot that runs the length of the device so that the filament is positioned between both sets of dual heat flow sensors. The width of the channel is sufficient so that the filament does not come into contact with the reference bodies. Preferably, the filament remains equal distance apart from the active junction lines (described below) of the two heat flow sensors flanking the filaments but this is not always possible due to lateral and/or vertical movement of the filament.

FIG. 7 is a front view of the device showing reference body 100 which defines channel 109. As is apparent, heat flow sensors 105 and 106 are embedded in separate cavities of reference body 100 so that each heat flow sensor has a face which is flushed with the reference body. Moreover, heatflow sensors 105 and 106 are positioned on opposite sides of the channel so as to face each other. (Although not shown in FIG. 7, heat flow sensors 107 and 108 of reference body 101 have the same configuration.) The dual sensors of each reference body are matched in sensitivity and are connected in series so that as the filament passes between the sensors, the total output is the same regardless of the filament's position in the channel. Thus, if the filament is closer to heat flow sensor 105, it will be correspondingly further from heat flow sensor 106 so that the total heat flux between the filament and the two sensors of each reference body is the same. The inventive device of FIGS. 6 and 7 also generally comprises the structures, including the temperature sensors, heating element, converters, and microcontroller, as shown in FIG. 4 and described above, but appropriately designed for dual heat flow sensors.

Each of the heat flow sensors in reference bodies 100 and 101 is preferably a thermopile which comprises an array of thermocouples. FIG. 9 shows a schematic side view of a thermopile as embedded in one of the reference bodies. The thermopile consists of an insulative member 140 onto which conductors 141 and 142 are positioned. The conductors which are made of different materials form junctions 143 and 144. As is apparent, reference junction 143 is in thermal contact with reference body 150 whereas junction 144 is exposed to the exterior and therefor to heat flow from the filament 120. The thermoelectric voltage developed between the two junctions is proportional to the temperature difference between the junctions. As will be discussed further below, the thermopile has a series of such junctions (or heat sensitive elements) which form an active junction line across the length of the thermopile facing the filament. The exposed face of the thermopile is normally coated with a polymer film.

FIG. 8a illustrates how thermopile 105 is embedded into reference body 100 so that the active junction line 110 is not aligned with the axis of filament 120 even though it is parallel with the filament. As shown, the filament is positioned slightly above the active junction line. Similarly, FIG. 8b shows thermopile 106 embedded into reference body 100 and positioned so that filament 120 is slightly below active junction line 111. Thermopiles 105 and 106 face each other as shown in FIG. 7.

FIGS. 8a and 8b illustrate the difficulties encountered when employing thermopiles to measure the heat flux of small diameter filaments. The problem arises from the fact that it is practically impossible to configure sensors that are identical given that the primary active portion of the thermopile is the series of active junctions. Ideally, filament 120 and active junction lines 110 and 111 would all be both parallel and aligned so as to fit onto a single plane. But it is difficult to maintain proper alignment since it is difficult to fabricate the sensor with its active junction line exactly on the center of each sensor body.

The present invention solves this problem by positioning each thermopile sensor so that the active junction line is oriented at an angle relative to the path of the filament as illustrated in FIG. 10. In FIG. 10, thermopile 105, which is embedded into reference body 100, is oriented so that the active junction line 110 is not parallel to filament 120; rather, the active junction line is tilted approximately 10° (α) relative to the filament axis. Similarly, thermopile 106, which is also embedded into reference body 100, is positioned so that the active junction line 111 is also not parallel to the filament. In this arrangement, in which both active junction lines are oriented in the same direction, active junction line 110 is substantially parallel to and aligned with active junction line 111 so that both lines are tilted at substantially the same angle (α) relative to the filament axis, however, the angles need not be the same.

With the present invention, either one or both sets of active junction lines are tilted with the latter arrangement being preferred. Specifically, as shown in FIG. 6, each of the four thermopiles is oriented so that the active junction line thereon is tilted with respect to the filament axis. The two sets of thermopiles can be oriented so that (1) the active junction lines on both sets are directed in the opposite direction as illustrated in FIG. 11, or (2) the active junction lines on both sets are directed in the same direction as illustrated in FIG. 10, or (3) one set is directed in the opposition direction and the other set is directed in the same direction.

FIG. 11 shows another embodiment of the invention in which thermopile 106 of reference body 100, has the same orientation as shown in FIG. 10; however, active junction line 110 of thermopile 105 is now directed in the opposite direction and is tilted by approximately 10° (α) relative to the filament axis. While the amount of tilting for the oppositely directed active junction lines 110 and 111 is the same (that is, α is approximately 10° for both), the amount of tilting need not be the same.

Angle α can range from greater than 0° to approximately 90°, but preferably from approximately 5° to 25°, and most preferably at approximately 10°. As is apparent, by tilting a thermopile, the active junction line thereof becomes misaligned with respect to the filament.

Intentionally misaligning both active junction lines of the dual thermopile sensors in each reference body provides better temperature measurement because the percentage of heat flow detected will remain relatively constant despite lateral and/or vertical movement by the filament while traveling through the channel. In effect, the non-identical nature of the sensor configurations (as described above) is automatically compensated for. Thus, in the embodiment where the active junction lines of the dual thermopiles in a reference body are tilted in opposite directions, the lines form a cross-like arrangement in the channel through which the filament passes. The arrangement improves the heat flow detection efficiency of the thermopiles which in turn reduces the sensitivity of the temperature measuring device to the movement of the filament.

In the fabrication of optical fibers, the temperature of the fibers can reach from about 150° to 500° F., or higher. In was found that when employing a dual sensor device in which the thermopiles were not tilted relative to the fiber axis, the measured temperature fluctuated as the fiber moved vertically in the channel. Indeed, even a slight vertical deviation of a few fiber diameter lengths from full alignment of the two active juncture lines and the fiber axis caused the measured temperature to change as much as 10° F. In contrast, when both thermopiles in each reference body were tilted approximately 10°, with the active junction lines directed in opposite directions, the temperature measurement deviated only by about 1° F. in response to the same amount of fiber vertical movement in the channel.

Although thermopile heat flow sensors have been used to illustrate the advantages of tilting the thermopiles, it is apparent that the invention is applicable to any heat flow sensor where the primary active portion of the sensor comprises a linearly configured element or series of elements.

The particular type of heat flow sensor or temperature sensor utilized in the various embodiments herein described need only be capable of providing an output directly proportional to heat flow, in the case of a heat flow sensor, or directly proportional to the temperature of the head or probe, in the case of the temperature sensor. Also, as will be apparent, the apparatus can be used with a variety of process controllers.

It is particularly noted that in utilizing the method and apparatus of the present invention, the temperature differences are at all times relatively small. That is, the temperature difference between the two reference bodies is in the order of 10° to 100° F.; moreover, the temperature differences between the reference bodies and the product is in the order of 0° to 100° F. As the external body passes by the operative faces, the fluid layers between the faces and external body take on temperature distributions which are dependent upon the temperatures of the reference and external bodies only. The reference bodies serve to isolate the measuring operation from the effects of the ambient temperature conditions, whereby the heat flows to be measured are a function of the relative temperatures of the reference bodies and the external body.

Although the various aspects of the present invention have been described with respect to the preferred embodiments, it will be understood that the invention is entitled to protection within the full scope of the appended claims.

It is claimed:

1. Apparatus for non-contact measurement of the temperature of a moving filament that is traveling along a linear path comprising:

first and second thermally conductive reference bodies;

means for maintaining said first and second reference bodies at different temperatures;

first and second heat flow sensors carried by said first reference body so that said heat flow sensors are positioned on opposite sides of said filament, wherein said first and second heat flow sensors are substantially matched in sensitivity and are connected in series, wherein said first and second heat flow sensors are reactive to heat flow to generate a first heat flow output signal that is proportional to the heat flow rate between the filament and the first reference body, and wherein each heat flow sensor has a plurality of heat flow sensitive elements that are linearly positioned so that the first heat flow sensor has a first row of sensitive elements that is not parallel to the path of said filament and the second heat flow sensor has a second row of sensitive elements that is not parallel to the path of said filament;

third and fourth heat flow sensors carried by said second reference body so that said heat flow sensors are positioned on opposite sides of said filament, wherein said third and fourth heat flow sensors are substantially matched in sensitivity and are connected in series, wherein said third and fourth heat flow sensors are reactive to heat flow to generate a second heat flow output signal that is proportional to the heat flow rate between the filament and the second reference body, wherein the third and fourth heat flow sensors have a plurality of heat flow sensitive elements that are linearly positioned so that the third heat flow sensor has a third row of sensitive elements that is not parallel to the path of said filament and the fourth heat flow sensor has a fourth row of sensitive elements that is not parallel to the path of said filament;

first and second temperature sensors carried by said first and second reference bodies, respectively, wherein said first temperature sensor is in thermal communication with and adapted to generate a first temperature output signal that is proportional to the temperature of the first reference body, and wherein said second temperature sensor is in thermal communication with and adapted to generate a second temperature output signal that is proportional to the temperature of the second reference body; and means responsive to said first and second heat flow output signals and said first and second temperature output signals for calculating the temperature of said filament.

2. The temperature measurement apparatus as defined in claim 1 wherein said first row and second row are tilted in substantially opposite directions with respect to each other, and wherein said third row and fourth row are tilted in substantially opposite directions with respect to each other.

3. The temperature measurement apparatus as defined in either claim 1 or 2 wherein each row is tilted approximately 5 to 25 degrees relative to the path of the filament.

4. The temperature measurement apparatus as defined in claim 3 wherein each row is titled approximately 10 degrees relative to the path of the filament.

5. Apparatus for non-contact measurement of the temperature of a moving filament that is traveling along a linear path comprising:

first and second thermally conductive reference bodies;

means for maintaining said first and second reference bodies at different temperatures;

first and second thermopile sensors carried by said first reference body so that said thermopile sensors are positioned on opposite sides of said filament, wherein said first and second thermopile sensors are substantially matched in sensitivity and are connected in series, wherein said first and second thermopile sensors are reactive to heat flow to generate a first heat flow output signal that is proportional to the heat flow rate between the filament and the first reference body, and wherein each thermopile sensor has a plurality of active junctions that are linearly positioned so that the first thermopile sensor has a first active junction line that is not parallel to the path of said filament and the second thermopile sensor has a second active junction line that is not parallel to the path of said filament;

third and fourth thermopile sensors carried by said second reference body so that said thermopile sensors are positioned on opposite sides of said filament, wherein said third and fourth thermopile sensors are substantially matched in sensitivity and are connected in series, wherein said third and fourth thermopile sensors are reactive to heat flow to generate a second heat flow output signal that is proportional to the heat flow rate between the filament and the second reference body, wherein the third and fourth thermopile sensors have a plurality of active junctions that are linearly positioned so that the third thermopile sensor has a third active junction line that is not parallel to the path of said filament and the fourth thermopile sensor has a fourth active junction line that is not parallel to the path of said filament;

first and second temperature sensors carried by said first and second reference bodies, respectively, wherein said first temperature sensor is in thermal communication with an adapted to generate a first temperature output signal that is proportional to the temperature of the first reference body, and wherein said second temperature sensor is in thermal communication with and adapted to generate a second temperature output signal that is proportional to the temperature of the second reference body; and means responsive to said first and second heat flow output signals and said first and second temperature output signals for calculating the temperature of said filament.

6. The temperature measurement apparatus as defined in claim 5 wherein said first and second active junction lines are tilted in substantially opposite directions with respect to each other, and wherein said third and fourth active junction lines are tilted in substantially opposite directions with respect to each other.

7. The temperature measurement apparatus as defined in either claim 5 or 6 wherein each active junction line is tilted approximately 5 to 25 degrees relative to the path of the filament.

8. The temperature measurement apparatus as defined in claim 7 wherein each active junction line is titled approximately 10 degrees relative to the path of the filament.

* * * * *